United States Patent Office 3,463,282
Patented Aug. 26, 1969

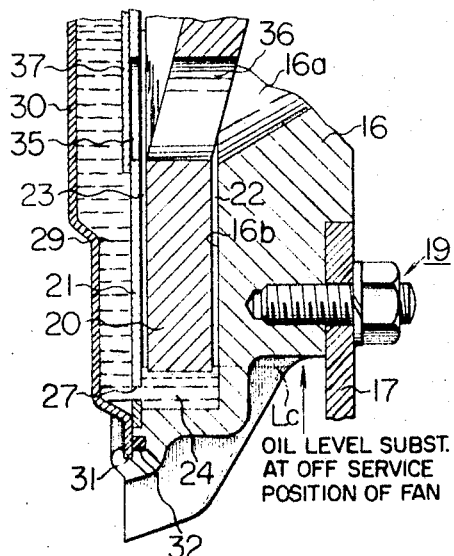
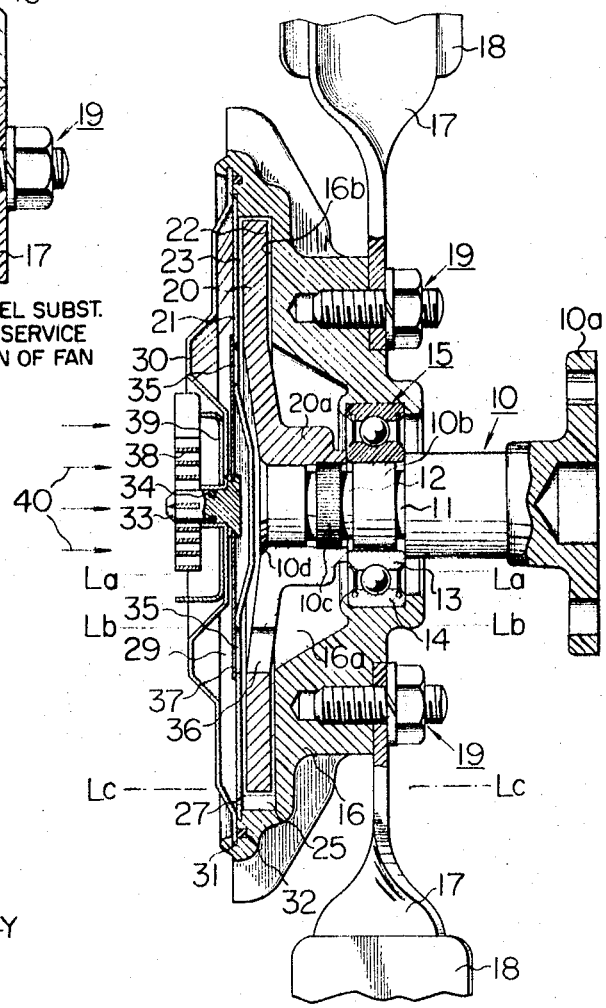
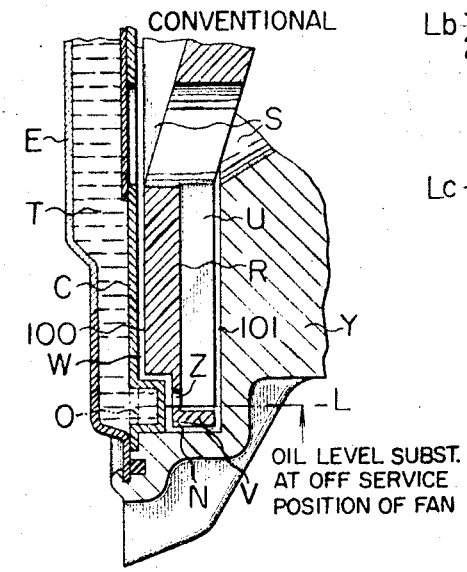

3,463,282
CONTROLLED TYPE FLUID COUPLING
Saburo Fujita and Uichiro Kobashi, Kariya-shi, Japan, assignors to Aisin Seiki Company Limited, Kariya-shi, Aichi-ken, Japan
Filed Jan. 22, 1968, Ser. No. 699,719
Claims priority, application Japan, Jan. 21, 1967, 42/5,679
Int. Cl. F16d 31/00, 11/00, 19/00
U.S. Cl. 192—58                        5 Claims

ABSTRACT OF THE DISCLOSURE

A controlled type fluid coupling wherein pumping means comprising a plurality of axially extending liquid weiring and blocking means are provided within the peripheral pumping chamber defined between the outer periphery of a driving member and the inner periphery of a driven member, said both members being arranged relatively rotatable through the intermediary of at least an antifriction bearing.

---

This invention relates generally to a fluid coupling mechanism comprising a driving part and a driven part and adapted for performing power transmission service under the utilization of viscous fluid shearing force caused by the rotating parts of said mechanism in cooperation with a viscous fluid contained therein. More specifically, it relates to a pumping mechanism of the fluid coupling of the above kind and of the controllable type which is adapted for transmitting variable turning torque depending upon a characteristic data such as the temperature condition of the prime mover such as automotive engine, said pumping mechanism serving to establish a forced fluid communication between the working chamber and the fluid reservoir chamber provided in the fluid coupling.

It is an object of the present invention to provide a fluid coupling of the above kind, capable of realizing substantially a complete disengaged condition of the machine.

It is a further object to provide a fluid coupling of the above kind, capable of discharging the coupling fluid off the working chamber of the coupling to a maximum possible degree.

Still another object is to provide a fluid coupling of the above kind, capable of bringing it into its disengaged position at a shortest possible time period when it is so controlled.

Still further object is to provide a fluid coupling of the above kind, having a broader controllability than hitherto attainable according to the conventional technique.

Still another object is to provide a fluid coupling of the above kind, capable of reducing considerably otherwise possible power loss of the prime mover to which the fluid coupling is drivingly connected which is attributable to over-cooling of the prime mover.

Still a further object is to provide a fluid coupling of the above kind wherein said pumping means may be used as cast, without necessity of further mechanical finishing.

Still another object is to provide a fluid coupling of the above kind which is superior and accurate to operate, easy to manufacture and economical in its price.

These and further objects, features and advantages of the invention will become more clear when reading the following detailed description of the invention to be set forth hereinunder by reference to the accompanying drawings illustrative of a conventional comparative fluid coupling and a preferred sole embodiment of the invention. It should be noted however that the drawings are only for illustrative purpose and therefore not to be construed to be limitative of the present invention.

In the drawings:

FIG. 1 is a sectional view of part of a comparative conventional fluid coupling.

FIG. 2 is a longitudinal sectional view of a preferred embodiment of the invention wherein however substantial parts only are shown and several parts are exemplified in a simplified manner or partially broken away.

FIG. 3 is a detailed sectional view of a part of the view shown in FIG. 2 and represented on an enlarged scale.

Figure 4:
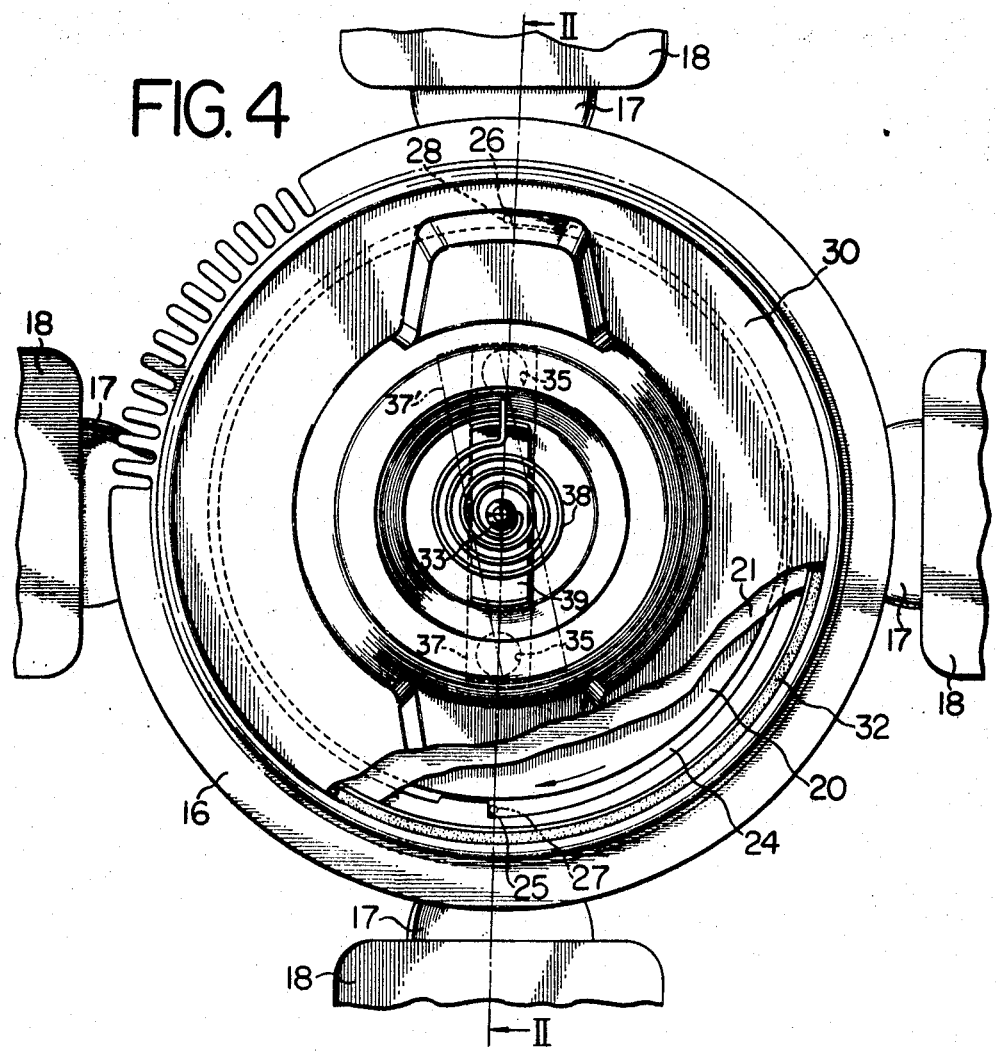
FIG. 4 is a front view of the embodiment shown in FIG. 2, wherein however several parts have been broken away and certain parts have been exemplified in a simplified way.
Figure 5:
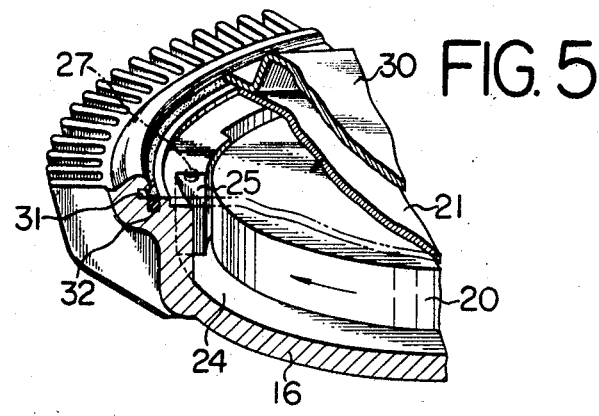
FIG. 5 is a perspective view of a part of the embodiment shown in FIGS. 3 and 4, wherein however certain parts have been broken away and sectioned.

Before entering into the detailed description of a preferred embodiment of the invention, a comparative conventional pumping mechanism embodied in the fluid coupling of the above kind will be briefly set forth hereinbelow by reference to FIG. 1.

In FIG. 1, R denotes a rotor disc having a radially extending wall surface 100. A fluid reservoir chamber T and the working chamber S are separated from each other by the provision of a separator disc C, a radial ring gap W being formed between said wall surface 100 and said disc C. Separator disc C is formed with separated projections V, extending axially and inwardly, in addition with a plurality of fluid communication openings O, of which however only one is shown in FIG. 1, being represented in chain-dotted lines.

The reservoir chamber T is defined by end cover E and separator disc C. In this arrangement, the rotor disc R acts as a driving member, while finned rotor casing Y, separator disc C and end cover E act in unison with each other as a driven member. The power is transmitted from the driving member to the driven member through the viscous shearing force induced in a viscous fluid such as silicon oil existing in the small gaps formed therebetween and caused by the rotational movement of the drive member. Level line L denotes the oil level surface contained in said gaps communicating with the working chamber S in the fluid coupling, as observed when the fan, not shown, rigidly mounted on the rotor casing is practically kept in its non-cooling service condition.

It can be observed in this case that in consideration of the mutual operating condition of the protections V and the cooperating part of the driving rotor disc R recessedly shaped as shown, the fluid communication openings O formed through the separator disc C can not be provided radially outside of the outer peripheral surface of the rotor R and thus when the driven part of the fluid coupling is brought into its practical off-service condition which means such a condition that the driven part including rotor casing Y, separator disc C and end cover E is brought practically into its relative rotational conditional to driving member or rotor disc R is which is being even rotating, a substantial quantity of the coupling viscous liquid will remain around the outer peripheral part of the disc and thus no complete operational interruption will occur between the both parts of the fluid coupling. On account of this defective feature, a considerably longer time period must be necessarily consumed until the driven member will have been brought into its dead stop condition, since considerable difficulties may be encountered in discharging the liquid from the radial gap space 101 defined between the rotor disc R and the rotor casing Y, where no provision is made of the pumping mechanism such as that denoted V, into the reservoir chamber T. For obviating these difficulties and for accelerating the discharge flow in the above sense, troublesome, tedious and additional provision of liquid passage means will be necessary to adopt. For instance, a plurality of radial grooves U must be formed in the back surface of the rotor disc R. In addition, a number of liquid passage openings Z have conventionally formed through the wall of the disc R, only one of said openings being shown in FIG. 1. Further, serrations N serving as discharge accelerating means have been commonly provided on the outer peripheral surface of the rotor disc R.

The invention in its broadest meaning resides in the provision of unique and highly improved pumping means serving for the similar liquid discharging purpose and formed in the peripheral space defined between the outer peripheral surface of the driving rotor disc and the inside wall surface of the rotor casing acting as driven member and surrounding said driving rotor, so as to substantially obviate the aforementioned conventional drawbacks.

Next referring to FIGS. 2–5, illustrative of a preferred embodiment according to the invention, the numeral 10 represents generally a drive shaft having a coupling flange 10a permanently connected by bolting with a belt pulley, not shown, for drivingly connecting with a prime mover, preferably an automotive engine, again not shown. Although not shown, the pulley is rotatably supported by a pair of antifriction bearings, not shown, for rotatably supporting in position of said drive shaft 10 and its related parts.

A pair of separated circular grooves 11 and 12 are formed on the shaft 10 at an intermediate position thereof, so as to form a cylindrical land 10b, and the inner race at 13 of sealed antifriction bearing of conventional design, generally shown at 15, is press-fit on the land, while the outer race at 14 of the bearing is made rigid with the inner periphery of a movable casing member 16 called "rotor casing," to which a plurality of stems 17 are fixedly attached by means of bolts and nuts, generally shown at 19. As shown, stems 17 carry rigidly respective radially and outwardly extending fan blades 18, four in number in this embodiment, as most clearly seen from FIG. 4.

Rotor disc 20 is rigidly mounted on the free end of drive shaft 10 by means of a serrated collar 10c and the flared shaft end at 10d, for unitary rotation with the shaft. The boss at 20a projects a certain distance along the shaft 10 towards the bearing 15 and within the working chamber 16a formed in the rotor casing 16 substantially into the form of a horizontal truncated cone combined with an enlarged disc-shaped space in which the outer and substantial part of the rotor disc 20 operates with certain plays. The disc-shaped space is closed by a centrally recessed disc plate 21 which thus defines the outer limit of the chamber 16a. Between the inner radial surface 16b formed on the rotor casing 16 and the rotor disc 20, there is provided a small radially extending gap 22 and, in the similar way, a radial gap 23 is provided between the disc 20 and the plate 21, thus said three members 16, 20 and 21 establishing a face-to-face, but slightly separated relationship one after another. As will be later described herein, the provision of these gaps 22 and 23 serves for power transmission relying upon the viscous shearing force forcibly induced in the viscous fluid such as silicon oil contained therein.

A plumping chamber 24 is defined between the inner peripheral wall surface of said disc space in the rotor casing 16 and the outer peripheral surface of the rotor disc 20, a plurality of, herein shown two in their number, as an example, at 25 and 26, FIG. 4, fluid blocking radial wall being formed in the pumping chamber. This chamber is divided into two in the present embodiment and each such divided chamber section increases gradually in its cross-sectional area towards said blocking wall 25 or 26. These walls 25 and 26 are formed integral on the inner peripheral wall surface of rotor casing 16, as most clearly seen from FIG. 2. These walls may preferably be made as cast, thus without further mechanical finishing.

In close proximity to each of said fluid-blocking walls 25 and 26, there are formed small axial openings 27 and 28, respectively and completely through the disc plate 21 for establishing respective fluid communication passages between the pumping chamber 24 and the fluid reservoir chamber at 29 which is defined by the disc plate 21 and the end cover 30, the latter being held firmly in an inner peripheral wall of rotor casing 16 and exerting a resilient pressure upon the plate 21, so as to keep positively the latter in position shown. In order to avoid any fluid leakage, the end cover 30 is sealed by a sealing ring 32 embedded in the wall of the rotor casing 16.

At the center of end cover 30, a center piece 33 is pivotably and sealingly attached. For the latter purpose, a sealing ring 34 is embedded in the center piece for the prevention of any leakage of the viscous liquid from the reservoir chamber 29 to the outside of the machine.

A plurality of liquid return openings 35 are formed through the wall of disc plate 21. Rotor disc 20 is also formed with a plurality of liquid passage openings 36. Only one of said openings 36 is shown in FIGS. 2 and 3, as representative.

Center piece 33 mounts a valve member 37 preferably in the shape of a spring strip which normally covers resiliently the said openings 35. If there are more numerous openings 35 than two, the valve strip 37 may take the form of a spider.

38 represents a thermally sensible means preferably made of a bimetal spiral coil which is fixedly mounted with its innermost end extremity on the center piece 33, while the opposite or outermost extremity of the bimetal coil is fixedly attached to a fixture 39 which is in turn rigidly connected to end cover 30.

When the fluid coupling assembly is used for the automotive use for fan-cooling of the driving internal combustion engine, hot air flow is induced from a conventional radiator, not shown, by the fan assembly 17–18 towards the front surface of the fluid coupling so far described, as hinted by four small arrows, generally denoted 40 in FIG. 2. Therefore, the bimetal coil 38 is sensible to this hot air temperature which is a function of the cooling water temperature circulating between the engine jacket and the radiator, or in other words, a function of the thermal load of the engine, as a generalized measure. As is commonly known, the engine cooling problem for modern automotive engineers and drivers is of most concern in the sense of over-cooling, especially in winter, rather than the problem of insufficient cooling.

The operation of the abovementioned fluid coupling is as follows:

When the engine is started, motion is transmitted therefrom through a belting or the like transmission means and coupling flange 10a to the drive shaft 10, thereby the rotor disc 20 being brought into unitary rotation therewith. Before the initiation of this starting motion, the oil level within both chambers 16a and 29 is common by virtue of the provision of communication openings 27, 28 and as at La shown in FIG. 3.

With the rotation of the driving disc 20, it accompanies therewith the viscous liquid from the oil pool having the said liquid level La and thus the liquid gradually fills all the several radial gaps around the disc, then gradually occupying an outer peripheral zone of the working chamber 16a. By the viscous shearing force caused to take place by the rotation of the disc now surrounded by the viscous liquid, rotational movement is naturally transmitted through the intermediary of the viscous liquid to the driven member including the rotor casing 16, thus the fan assembly being caused to rotate in unison therewith. At the last moment, there would be only a small slip between the rotational movements of the driving and the driven member, so far as the engine speed is moderate.

As an example, when the automotive engine has its maximum allowable running speed of 6,000 r.p.m., the cooling water temperature must preferably be kept at 70–90° C. and the hot air stream downstream the cooling radiator may be in the range of 55–65° C. as observed at the place of bimetal coil 38.

When the rotational speed of the fan rotor 16 is moderate for a medium running speed of the engine such as 1,500 r.p.m. or so and the engine is sufficiently cooled, liquid communication openings 35 are kept closed by the spring valve member 37 as shown by dotted lines in FIG. 4. With rotation of the fan rotor 16 under these conditions, the oil contained in the pumping chamber 24 will impinge upon the blocking or weiring wall 25–26, which action contributes instantly to increase the static oil pressure prevailing at these places so that it overcomes the combined static and dynamic oil pressure prevailing in the reservoir chamber 29, thus oil being forced to flow from the pumping chamber to the reservoir chamber, thereby reducing the contained oil quantity in the working chamber 16a including the pumping chamber and its related radial gaps 22 and 23 to a lower level such as at Lb shown in FIG. 2, and reducing the coupling factor between the drive member and the driven member of the fluid coupling assembly. This means that the engine cooling effect has been relatively reduced.

When the temperature of the hot air in contact of the bimetal coil 38 is elevated to a certain degree by virtue of the reduced engine cooling caused by the reduced coupling factor in the above mentioned sense, the coil is deflected thermally by contact with hotter air stream so that the valve member 37 is rotated, for instance, in the counter-clockwise direction as seen in FIG. 4, so as to shift from the valve-closing position to a semi-opening one shown at 37'. Thus, the fluid passage openings 35 are opened to a lesser or larger degree, thereby the oil is correspondingly transferred from the reservoir chamber to the woking chamber 16a including radial gaps 22–23. Thus, the coupling factor is increased and the engine cooling is accentuated.

When it is assumed that the engine runs at the maximum allowable speed such as 6,000 r.p.m., an overcooling of the engine may frequently take place, if generally speaking and especially when the vehicle fitted with the present controlled fluid coupling runs at a highest possible speed on a highway, for instance in winter. In this case, the bimetal will effectively act to control the strip valve 37 so as to close the passage openings 35 in the similar way. In extreme cases, when it is desired practically to disengage the driven member from the drive member in an automatic way, the passage openings 35 are kept in closed position so that the oil level within the pumping chamber 24 will lower to the possible lowest level such as shown at Lc in FIGS. 2 and 3. In this way, the lowest possible fan speed such as 700 r.p.m. may be realized under such assumption that the transmission ratio between the engine and the drive shaft 10 be 1:1, while, when relying upon the conventional technique as illustrated hereinbefore by reference to FIG. 1, the lowest possible fan speed may amount as high as 1,200 r.p.m. Thus, it will be clear from the foregoing that the practical interruption between the drive member and the driven member may be carried into effect in a quicker, more efficient and reliable manner than obtainable with the conventional technique. Therefore, with use of the aforementioned fluid coupling adapted for fan drive, the engine cooling is carried out at an economical power consumption concerning the fan drive.

It may be naturally thought out by those skilled in the art to replace the bimetal coil 38 by a speed governor, accelerator governor or the similar means, the fluid coupling so far described may operate depending upon other engine operational data such as, for instance, engine running speed, accelerator or the like.

What is claimed as new and to be secured by Letters Patent is:

1. In a controlled type fluid coupling comprising a drive shaft, a drive rotor fixedly mounted on said shaft, a driven member rotatably mounted on said shaft, a fluid working chamber formed in said driven member, a fluid reservoir chamber formed in said driven member, a separator disc fixedly mounted in said driven member and physically separating said reservoir chamber from said working chamber, fluid passage means formed through said separator disc for establishing a fluid communication between said both chambers, a pumping chamber constituting part of said working chamber, and a pumping means provided within said pumping chamber adapted for feeding said fluid from said pumping chamber into said reservoir chamber, the improvement comprises that said pumping chamber is formed between the outside peripheral surface of said driving member and the inside peripheral surface of said driven member, a plurality of axially extending weir means are provided across and within said pumping chamber for acting as said pumping means, an axial fluid passage opening being formed through the wall of said separator disc directly in advance of each of said weir means.

2. A fluid coupling as set forth in claim 1, wherein said weir means are cast integral on the inside wall surface of said rotor casing carrying thereon a cooling fan assembly.

3. A fluid coupling as set forth in claim 1, wherein said separator disc is formed with a plurality of fluid passage openings cut therethrough and adapted for establishing fluid communication passages from said reservoir chamber to said working chamber.

4. A fluid coupling as set forth in claim 3, wherein further the outer extremity of said fluid reservoir chamber is defined an end cover mounted on said rotor casing, said coupling further comprising a center piece rotatably mounted at the center of said end cover, a valve member rigidly mounted on said center piece and adapted for control of the opening degree of said fluid passage openings, and a temperature sensing member with its one end rigidly connected with said center piece and with its other end physically connected with said end cover.

5. A fluid coupling as set forth in claim 4, wherein said temperature sensing means is a spirally coiled bimetal.

References Cited

UNITED STATES PATENTS 3,259,221 7/1966 Godfrey.
3,268,041 8/1966 Roper.

CARLTON R. CROYLE, Primary Examiner

A. D. HERRMANN, Assistant Examiner

U.S. Cl. X.R.

192—82